(12) United States Patent
Inoue

(10) Patent No.: US 11,392,335 B2
(45) Date of Patent: Jul. 19, 2022

(54) INFORMATION PROCESSING APPARATUS, CONTROL METHOD, AND STORAGE MEDIUM FOR TRANSMITTING PRINT DATA

(71) Applicant: CANON KABUSHIKI KAISHA, Tokyo (JP)

(72) Inventor: Takumi Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/129,602

(22) Filed: Dec. 21, 2020

(65) Prior Publication Data

US 2021/0200488 A1 Jul. 1, 2021

(30) Foreign Application Priority Data

Dec. 26, 2019 (JP) .............................. JP2019-237552

(51) Int. Cl.
*G06F 3/12* (2006.01)
(52) U.S. Cl.
CPC ............ *G06F 3/1243* (2013.01); *G06F 3/123* (2013.01); *G06F 3/1206* (2013.01); *G06F 3/1225* (2013.01); *G06F 3/1232* (2013.01); *G06F 3/1248* (2013.01)
(58) Field of Classification Search
None
See application file for complete search history.

(56) References Cited

U.S. PATENT DOCUMENTS

2010/0225959 A1* 9/2010 Selvaraj ................ G06F 3/1244
358/1.15
2013/0201504 A1* 8/2013 Miller ................... G06F 3/1232
358/1.13

FOREIGN PATENT DOCUMENTS

JP 2006-048213 A 2/2006

* cited by examiner

*Primary Examiner* — Lennin R Rodriguezgonzalez
(74) *Attorney, Agent, or Firm* — Canon U.S.A., Inc. IP Division

(57) ABSTRACT

An information processing apparatus manages information about a printing apparatus incapable of interpreting print data in a predetermined format and executes operating system (OS) normal printing software that generates print data in the predetermined format. In a case where capability information about the printing apparatus incapable of interpreting print data in the predetermined format is requested from the OS normal printing software, the information processing apparatus generates the capability information based on language information held by a control unit and language information held by a generation unit, and transmits the generated capability information to the OS normal printing software.

15 Claims, 16 Drawing Sheets

FIG.2

201 — requested-attributes(1setOf keyword):
   'printer-strings-languages-supported'

203

202 — printer-strings-languages-supported
   (1setOf naturalLanguage):
   'en-us'

— printer-strings-languages-supported
   (1setOf naturalLanguage):
   'ja-jp', 'en-us', 'fr', 'de', 'it',
   'es', 'pt-br', 'nl', 'da', 'no', 'sv',
   'fi', 'pl', 'cs', 'ru', 'ar', 'tr',
   'zh-cn', 'zh-tw', 'ko', 'th', 'id'

FIG.4

401 ～ operation-id: Get-Priter-Attributes

402 ～ requested-attributes(1setOf keyword):
       'color-supported',
       'copies-supported',
  403 ～ 'printer-strings-languages-supported'

404 ～ status-code: Successful
       requested-attributes(1setOf keyword):
       'color-supported(boolean)' : true,
       'copies-supported(boolean)' : true,    405
       'printer-strings-languages-supported(1setOf keyword)': 'ja-jp', 'en-us',
         'fr', 'de', 'it', 'es', 'pt-br', 'nl', 'da', 'no', 'sv'

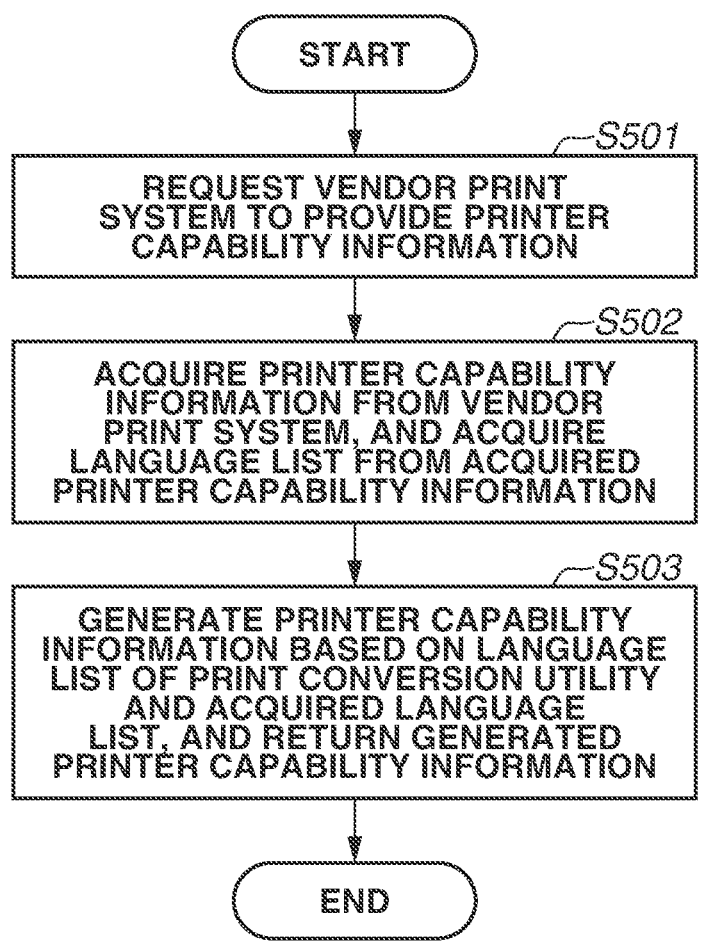

FIG.8

810 ~ [TABLE X]               811 ~ [TABLE Y]
        | VERSION |  DATE    |           | VERSION |  DATE    |
          2.2.0     2008/06/15 ~802        3.4.0     2006/05/23 ~804
801 ~     2.2.4     YYYY/MM/DD    803 ~    3.4.4     YYYY/MM/DD
          2.2.5     YYYY/MM/DD             3.4.5     YYYY/MM/DD
          2.2.7     YYYY/MM/DD             3.4.8     YYYY/MM/DD

FIG.10

1001　1002
User-Agent: XYZ SYSTEM/2.2.5(AAAAA NN.NN.N;)\r\n operation-id: Get-Printer-Attributes requested-attributes(1setOf keyword):
　　'color-supported',　　～1003
　　'copies-supported',
　　'printer-strings-language-supported'

FIG.12 operation-id: Get-Printer-Attributes
  attributes-natural-language(naturalLanguage): 'ja'  ~1201
  requested-attributes(keyword): 'printer-strings-uri' status-code:Successful           1202
  requested-attributes(1setOf keyword):
    printer-strings-uri(uri): 'http://AAAA0000XXXX.local./strings/ja.txt'

INFORMATION PROCESSING APPARATUS, CONTROL METHOD, AND STORAGE MEDIUM FOR TRANSMITTING PRINT DATA

BACKGROUND

Field of the Disclosure

The present disclosure relates to wording display processing in a print system.

Description of the Related Art

Japanese Patent Application Laid-Open No. 2006-48213 discusses a technology that prepares a multi-language environment in a server beforehand expecting that a client is using a language among multiple languages. Further, the technology provides an environment based on a language appropriate for a language environment requested by the client.

In recent years, a print system not considered in Japanese Patent Application Laid-Open No. 2006-48213 has been provided, and such a print system is also expected to display a screen using an appropriate language to improve the convenience of a user.

SUMMARY

According to embodiments of the present disclosure, an information processing apparatus manages information about a printing apparatus incapable of interpreting print data in a predetermined format and that executes operating system (OS) normal printing software that generates print data in the predetermined format, and the information processing apparatus includes a control unit configured to receive first print data via the OS normal printing software in a case where the printing apparatus incapable of interpreting print data in the predetermined format is selected and an instruction for printing execution is issued, a generation unit configured to generate second print data interpretable by the printing apparatus incapable of interpreting print data in the predetermined format based on the first print data, and a transmission unit configured to transmit the second print data to the printing apparatus incapable of interpreting print data in the predetermined format, wherein, in a case where capability information about the printing apparatus incapable of interpreting print data in the predetermined format is requested from the OS normal printing software, the control unit generates the capability information based on language information held by the control unit and language information held by the generation unit, and transmits the generated capability information to the OS normal printing software.

Further features of the present disclosure will become apparent from the following description of exemplary embodiments with reference to the attached drawings.

BRIEF DESCRIPTION OF THE DRAWINGS

FIG. 2 is a diagram illustrating the contents of a request for acquiring printer capability information and a response to the request.

FIG. 4 is a diagram illustrating the contents of a request for acquiring printer capability information and a response to the request.

FIG. 5 is a diagram illustrating a flow of processing by a print conversion utility.

FIG. 8 is a diagram illustrating tables.

FIG. 10 is a diagram illustrating version information.

FIG. 12 is a diagram illustrating the contents of a request for acquiring printer capability information and a response to the request.

DESCRIPTION OF THE EMBODIMENTS

Exemplary embodiments of the present disclosure will be described in detail below with reference to the drawings. The following exemplary embodiments are not intended to limit the present disclosure set forth in the claims, and not all combinations of features described in the exemplary embodiments are necessarily indispensable to a solution of the present disclosure.

Figure 1:
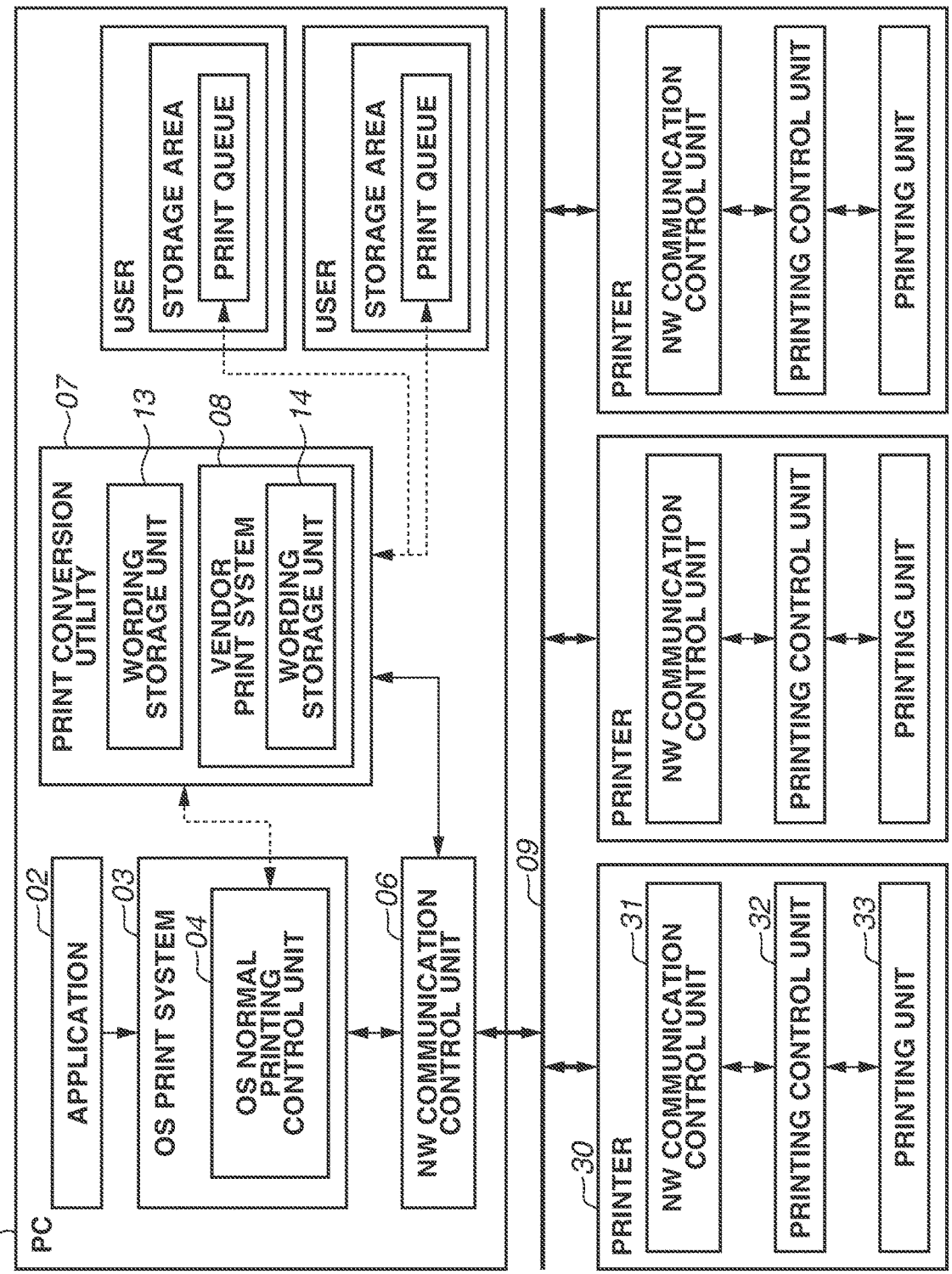
FIG. 1 is a diagram illustrating an overall configuration of a print system according to an exemplary embodiment.

FIG. 1 is a diagram illustrating an overall configuration of a print system according to a first exemplary embodiment. A personal computer (PC) 01 and a plurality of printers represented by a printer 30 are connected via a network 09, and can communicate with each other. In the present exemplary embodiment, the network 09 is a local area network (LAN), but may be a wide area network (WAN). The network 09 may have a connection configuration that is wired or wireless, or a mixture of them. The PC 01 controls the printer 30 connected via the network 09.

Although not illustrated in FIG. 1, an operating system (OS) is incorporated in the PC 01. Resources of the PC 01, such as each block in the PC 01, are managed by the OS. Here, the PC 01 has a hardware configuration that an ordinary information processing apparatus has. Specifically, the PC 01 includes a central processing unit (CPU), a read only memory (ROM), a hard disk, a random access memory (RAM), and various device controllers. The CPU executes a program, such as the OS and an application, stored in the ROM or loaded from the hard disk into the RAM. Processing in each flowchart to be described below can be implemented by the CPU executing the program. The RAM also functions as a main memory and a work area for the CPU. The PC 01 further includes a keyboard, a cathode-ray tube (CRT) display, and a disk controller (DKC) that controls data access to a hard disk (HD) or a flexible disk (FD) storing various data. The PC 01 further includes a communication control unit that controls exchange of signals with the connected printer.

The PC 01 can execute an application 02, an OS print system 03, an OS normal printing control unit 04, a network (NW) communication control unit 06, a print conversion utility 07, and a vendor print system 08. The print conversion utility 07 including the vendor print system 08 is used in a case where a printer not supporting OS normal printing is designated. The print conversion utility 07 is installed on the PC 01 as appropriate. The print conversion utility 07 and the vendor print system 08 include wording storage units 13 and 14, respectively. The wording storage units 13 and 14 each hold wording for each language to be displayed as an option in a print setting. For example, "Plain Paper" in English and "Normalpapier" in German are held as the wording. A function provided by the OS normal printing control unit 04 may be referred to as the OS normal printing function.

The OS print system 03 provides the OS normal printing control unit 04. In a case where a printer supporting the OS normal printing control unit 04 is designated and an instruction for printing is provided, print data is transmitted without using the print conversion utility 07. The printer supporting the OS normal printing control unit 04 interprets print data in a format conforming to the OS normal printing function. In the present exemplary embodiment, the format conforming to the OS normal printing function may be referred to as a predetermined format. On the other hand, a non-support printer not supporting the OS normal printing function cannot interpret the print data in the format conforming to the OS normal printing function. Thus, in a case where the non-support printer is designated and an instruction for printing is provided, the print conversion utility 07 operates to generate print data that can be interpreted by the non-support printer and transmit the generated print data to the non-support printer. The OS print system 03 sequentially processes a print request from the application 02 as a job for each of the printers connected to the PC 01. When a request for printing data created by a user using the application 02 is issued, the request is input to the OS print system 03 as a print job. Upon receiving the print job, the OS print system 03 generates print data in the format conforming to the OS normal printing function using the OS normal printing control unit 04. In a case where a printer supporting the OS normal printing control unit 04 is designated, the OS print system 03 transmits the print data generated using the OS normal printing control unit 04 to the printer via the NW communication control unit 06. Meanwhile, the user registers the non-support printer 30 in the OS print system 03 using the print conversion utility 07. The registration processing enables the non-support printer 30 to be displayed as an option in a printer list 311 in FIG. 3 to be described below. In order to use the print conversion utility 07 from the application 02, it is necessary to register a print queue of the non-support printer 30 in the OS normal printing function to receive a print request from the application 02. It is also necessary to register a print queue of the non-support printer 30 in the print conversion utility 07. In a case where the two print queues are registered, the user can select the non-support printer 30 in the printer list 311 in FIG. 3 to be described below and provide an instruction for printing. In other words, the OS print system 03 manages information about the non-support printer 30. In the present exemplary embodiment, the OS print system 03 may be referred to as OS normal printing software.

On the other hand, in a case where the non-support printer not supporting the OS normal printing control unit 04 is designated, at first, the OS print system 03 generates print data in the format conforming to the OS normal printing function using the OS normal printing control unit 04. Subsequently, the OS print system 03 transmits the generated print data in the format conforming to the OS normal printing function to the print conversion utility 07. Upon receiving the print data in the format conforming to the OS normal printing function, the print conversion utility 07 converts the received print data into print data in a format specific to a vendor and transmits the print data in the format specific to the vendor to the vendor print system 08. The non-support printer 30 can interpret the print data in the format specific to the vendor. The vendor print system 08 transmits the print data in the format specific to the vendor to the printer 30 via the NW communication control unit 06. As a result, even if the non-support printer is designated, the non-support printer can print an image on a sheet based on the print data. The vendor refers to a manufacturer of the non-support printer. The vendor print system 08 generates print data and thus may be referred to as a generation unit.

When the OS print system 03 communicates with the print conversion utility 07, a protocol used in the OS normal printing function (OS normal protocol) is used. For example, a standard print protocol called the Internet Print Protocol (IPP) is used. The print conversion utility 07 uses an original protocol when communicating with the vendor print system 08. Examples of the original protocol include a vendor original protocol. In a case where print data generated by the print conversion utility 07 is transmitted to the non-support printer 30, the print data is transmitted using the vendor original protocol. The printer 30 includes a NW communication control unit 31, a printing control unit 32, and a printing unit 33. The printing control unit 32 receives print data from the PC 01 via the NW communication control unit 31 and controls the printing unit 33 based on the print data to execute printing.

In the present exemplary embodiment, the printer 30 does not support the OS normal printing function, and the printer 30 supports a printing function using the vendor print system 08. Thus, the printer 30 executes print processing based on print data generated via the print conversion utility 07 from the OS normal print control unit 04.

Figure 3:
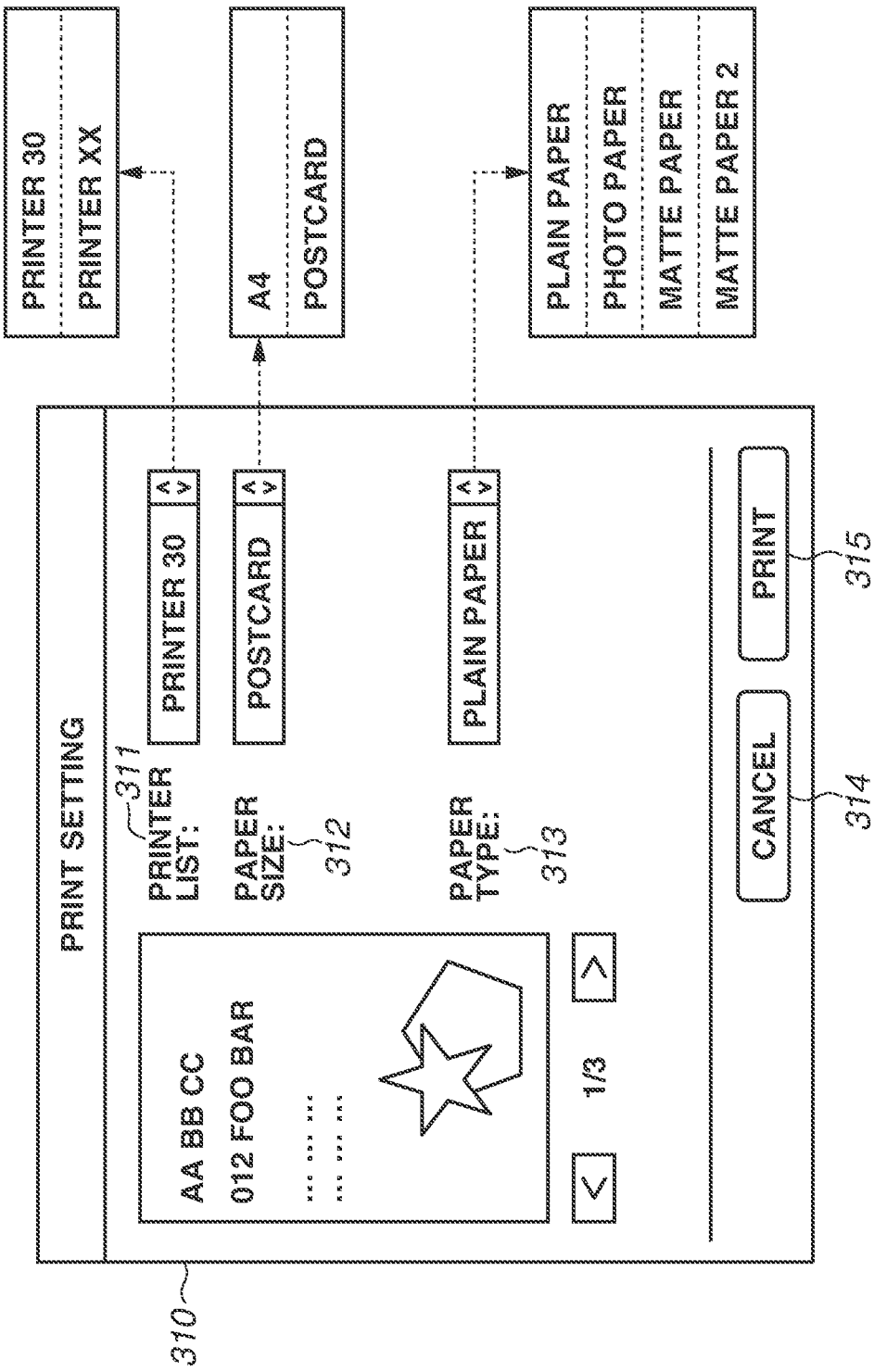
FIG. 3 is a diagram illustrating a print setting screen of an operating system (OS) print system.

FIG. 3 is a diagram illustrating an OS normal user interface (UI) 310 serving as a print setting screen. The OS print system 03 provides the OS normal UI 310 as a print setting screen for printing the data created using the application 02. The printer list 311 on the OS normal UI 310 displays names of printing apparatuses available for printing. The user can select a printer to be used for printing from the printer list 311. The printer list 311 also displays a print queue registered in the OS print system 03.

The OS print system 03 reflects the content of printer capability information in a pop-up menu (options) for an item indicated as paper size 312 and a pop-up menu (options) for an item indicated as paper type 313. In the present exemplary embodiment, the non-support printer 30 not supporting the OS normal printing function is registered. The print conversion utility 07 is used to register the non-support printer 30. The print conversion utility 07 may attach additional identification information to the name of the printing apparatus registered in the print conversion utility 07 and notify the OS print system 03 of the registered printing apparatus. In a case where the above-described identification information is added to the printer name in the printer list 311, the user can recognize the printer as a printer to use the print conversion utility 07. For example, in a case where the user uses the printer 30, the user can recognize use of the print conversion utility 07 from the printer list 311 displaying "Printer 30 (print conversion utility)".

In contrast, with respect to the printing apparatus supporting the OS normal printing function, the printer list 311 displays only the name of the printing apparatus. In other words, the user can recognize non-use of the print conversion utility 07 because the above-described identification information is not added to the printer name. After selecting the printer using the printer list 311, the user can select a paper size and a paper type on the OS normal UI 310 of the OS print system 03. In the present exemplary embodiment, a configuration is described where the user can set print setting information about two items of the paper size and the paper type using the OS normal UI 310, but another setting item may be included. For example, a setting item about another printing function such as monochrome print setting and double-side print setting may be present on the OS normal UI 310. Finally, the user presses a print button 315, so that the print job based on the print setting information set on the OS normal UI 310 is transmitted to the OS print system 03. The user can cancel the print setting by pressing a cancel button 314.

There is a case where the OS print system 03 requests the print conversion utility 07 to provide the printer capability information. For example, in a case where the non-support printer is selected in the printer list 311, the OS print system 03 requests the print conversion utility 07 to provide the capability information. FIG. 4 illustrates an example of a request command for the printer capability information to be transmitted from the OS print system 03 to the print conversion utility 07, and a response command issued in response to the request command. The request command and the response command are expressed using the IPP. Commands 401 to 403 are examples of a command included in the request command, and commands 404 and 405 are examples of a command included in the response command. The command 401 indicates the request command for printer capability information. The command 402 indicates attributes representing a request content list. In FIG. 4, information about a color function, a function of printing a plurality of copies, and support languages is requested. The command 403 included in the request content list corresponds to a request for support language.

The command 404 is an example of the response command issued in response to the request command. In the example in FIG. 4, the request command indicates that the color function and the function of printing a plurality of copies are available. The command 405 is a character string representing support language information indicating the type of the support language. For example, "ja-jp" included in the character string represents Japanese, "en-us" represents English, and "it" represents Italian. As the attribute information such as the command 403, there is a plurality of kinds of information to make various requests not only for acquiring the support language information, but also for acquiring information indicating whether the double-side print setting is permitted. Although not illustrated in FIG. 4, the request for capability information includes the identification information about a printing apparatus as a target for acquisition. For example, in a case where the printer 30 is selected in the printer list 311, the OS print system 03 issues the request for capability information including the identification information about the printer 30 to the print conversion utility 07.

Upon receiving the request, the print conversion utility 07 reads capability information corresponding to the identification information about the printer 30 from a storage unit and provides the read capability information as a response. Further, based on the receipt of the request for capability information from the OS print system 03, the print conversion utility 07 may request the vendor print system 08 to provide capability information corresponding to the identification information about the printer 30. Then, the print conversion utility 07 may acquire the capability information corresponding to the identification information about the printer 30 from the vendor print system 08, and transmit the acquired capability information to the OS print system 03.

The present exemplary embodiment will be described using an example in which the user selects the printer 30 from the printer list 311 on the OS normal UI 310. In the present exemplary embodiment, the user sets priorities on a plurality of languages that can be displayed by the OS as languages to be used in an application or a UI, using the function of the OS. In other words, a language given a high priority is used in an application or a UI based on the priorities set using the function of the OS.

When the user selects the printer 30 on the OS normal UI 310 as a printer to be used, the OS print system 03 requests the print conversion utility 07 to provide the printer capability information to enable print setting corresponding to the printer 30. The OS print system 03 displays options for the paper size 312 and the paper type 313 on the OS normal UI 310 based on the printer capability information received as a response to the request.

Figure 9:
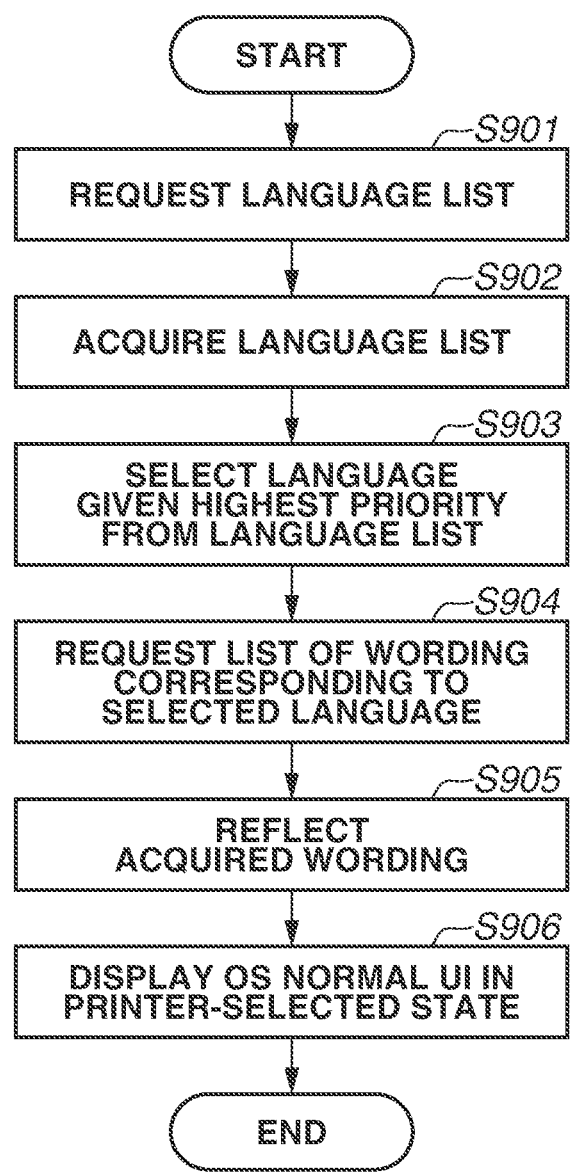
FIG. 9 is a diagram illustrating a flow of processing by the OS print system.

FIG. 9 illustrates a flow of processing to be executed by the OS print system 03. The processing in FIG. 9 starts based on selection of the non-support printer (e.g., the printer 30) from the printer list 311 on the OS normal UI 310 by the user as a printer to be used.

In step S901, the OS print system 03 issues a request for printer capability information including a language list (language information list) to the print conversion utility 07, using the OS normal protocol. For example, the above-described request command including the commands 401 to 403 in FIG. 4 is transmitted to the print conversion utility 07. In step S902, the OS print system 03 acquires the printer capability information held by the print conversion utility 07 from the print conversion utility 07 as a response to the request, and acquires the language list included in the printer capability information. For example, in the above-described example in which the command 404 in FIG. 4 is used, "ja-jp" to "sv" are acquired.

In step S903, based on the priorities set on the languages supported by the OS, the OS print system 03 selects a language given the highest priority from the language list acquired in step S902. For example, the highest priority is set on Japanese by the user using the function of the OS, among the languages supported by the OS. Subsequently, English, Japanese, and Italian are acquired in step S902. In this case, Japanese is selected in step S903. In another example, the highest priority is set on Japanese, the second highest priority is set on English, and the third highest priority is set on German by the user using the function of the OS, among the languages supported by the OS. Subsequently, English and German are acquired in step S902. In this case, English is selected in step S903.

In step S904, the OS print system 03 issues a wording acquisition request, i.e., a request for acquiring a list of wording related to the print setting for the language selected in step S903, to the print conversion utility 07, using the OS normal protocol. In other words, in step S904, a request including information indicating the language selected in step S903 is issued.

In step S905, the OS print system 03 acquires a response to the wording acquisition request issued in step S904 and reflects wording included in the response as the wording to be used by the printer 30 registered in the OS print system 03. For example, in a case where a request designating English is issued in step S904, "Plain Paper", "Photo Paper", and "Matte Paper" are acquired as the wording for the paper type in step S905. In a case where a request designating German is issued in step S904, "Normalpapier", "Fotopapier", and "Mattepapier" are acquired as the wording for the paper type in step S905.

Next, in step S906, the OS print system 03 displays the OS normal UI 310 in a state where the printer 30 is selected in the printer list 311.

The above-described processing in FIG. 9 enables the OS print system 03 to display options in the language desired by the user as options displayed in the pop-up menu of each of the paper size 312 and the paper type 313. For example, the highest priority is set on English by the user using the function of the OS, among the languages supported by the OS. Subsequently, English, Japanese, and Italian are acquired in step S902. In this case, the OS print system 03 can display "Plain Paper", "Photo Paper", and "Matte Paper" as the options for the paper type 313. In another example, the highest priority is set on Japanese, the second highest priority is set on German, and the third highest priority is set on English by the user using the function of the OS, among the languages supported by the OS. Subsequently, English and German are acquired in step S902. In this case, the OS print system 03 can display "Normalpapier", "Fotopapier", and Mattepapier" in German as the options for the paper type 313. In a case where the wording is not included in the response in step S905, the OS print system 03 displays the options using a language given the highest priority among the languages supported by the OS. In this case, the printer capability information about a printer selected in the printer list 311 is not reflected in the options, and thus only limited options are displayed.

For example, plain paper, photo paper, and matte paper are registered as available sheets in the printer 30. Meanwhile, the OS print system 03 has only two types of sheet, the plain paper and the photo paper, as the options for the paper type. Here, in a case where the wording is not included in the response in step S905, the OS print system 03 displays only the two types of sheet, the plain paper and the photo paper, as the options for the paper type. As a result, the user cannot provide an instruction for printing using the matte paper to the printer 30.

FIG. 5 illustrates a flow of processing to be executed by the print conversion utility 07. The processing in FIG. 5 starts in a case where the print conversion utility 07 receives the request for printer capability information issued from the OS print system 03 in step S901. A command 201 in FIG. 2 is a portion extracted from the request command (FIG. 4) for printer capability information issued from the OS print system 03. FIG. 2 also illustrates a language 202 that can be displayed by the print conversion utility 07, and indicates that only English can be displayed. FIG. 2 also illustrates a command 203 as an example of a response command generated by executing the processing in FIG. 5.

In step S501, upon receiving the request for printer capability information from the OS print system 03, the print conversion utility 07 converts the received request into a command that can be interpreted by the vendor print system 08. Subsequently, the print conversion utility 07 issues a request for printer capability information to the vendor print system 08, using the command that can be interpreted by the vendor print system 08. The received request for printer capability information includes a request command for a language list. As an example of the request command, the command 201 represents a request command described using the IPP. The request for printer capability information transmitted from the OS print system 03 includes the identification information about the target printer. The print conversion utility 07 requests the vendor print system 08 that corresponds to the identification information about the target printer to provide printer capability information.

In step S502, the print conversion utility 07 acquires the printer capability information from the vendor print system 08 as a response to the request issued in step S501. Subsequently, the print conversion utility 07 acquires information representing the language list stored in the wording storage unit 14 of the vendor print system 08, from the acquired printer capability information. In step S503, the print conversion utility 07 generates printer capability information based on the language list held in the wording storage unit 13 of the print conversion utility 07 and the language list acquired in step S502. As a result, the printer capability information including the command 203 in FIG. 2, which includes not only English that can be displayed by the print conversion utility 07 but also other languages, is generated.

Subsequently, the print conversion utility 07 converts the generated printer capability information into a command that can be interpreted by the OS print system 03, and returns the command as a response to the request received in step S501 using the OS normal protocol.

Thus performing the processing in FIG. 5 enables the print conversion utility 07 to respond to the command 203 including the languages supported by not only the print conversion utility 07 but also the vendor print system 08. This processing increases the possibility that options corresponding to the language desired by the user are displayed on the OS normal UI 310 in FIG. 3, so that the convenience of the user improves. In other words, the OS normal UI 310 can display the types of language including the language that can be displayed by the print conversion utility 07 and the language that can be displayed by the vendor print system 08 are integrated.

Figure 6:
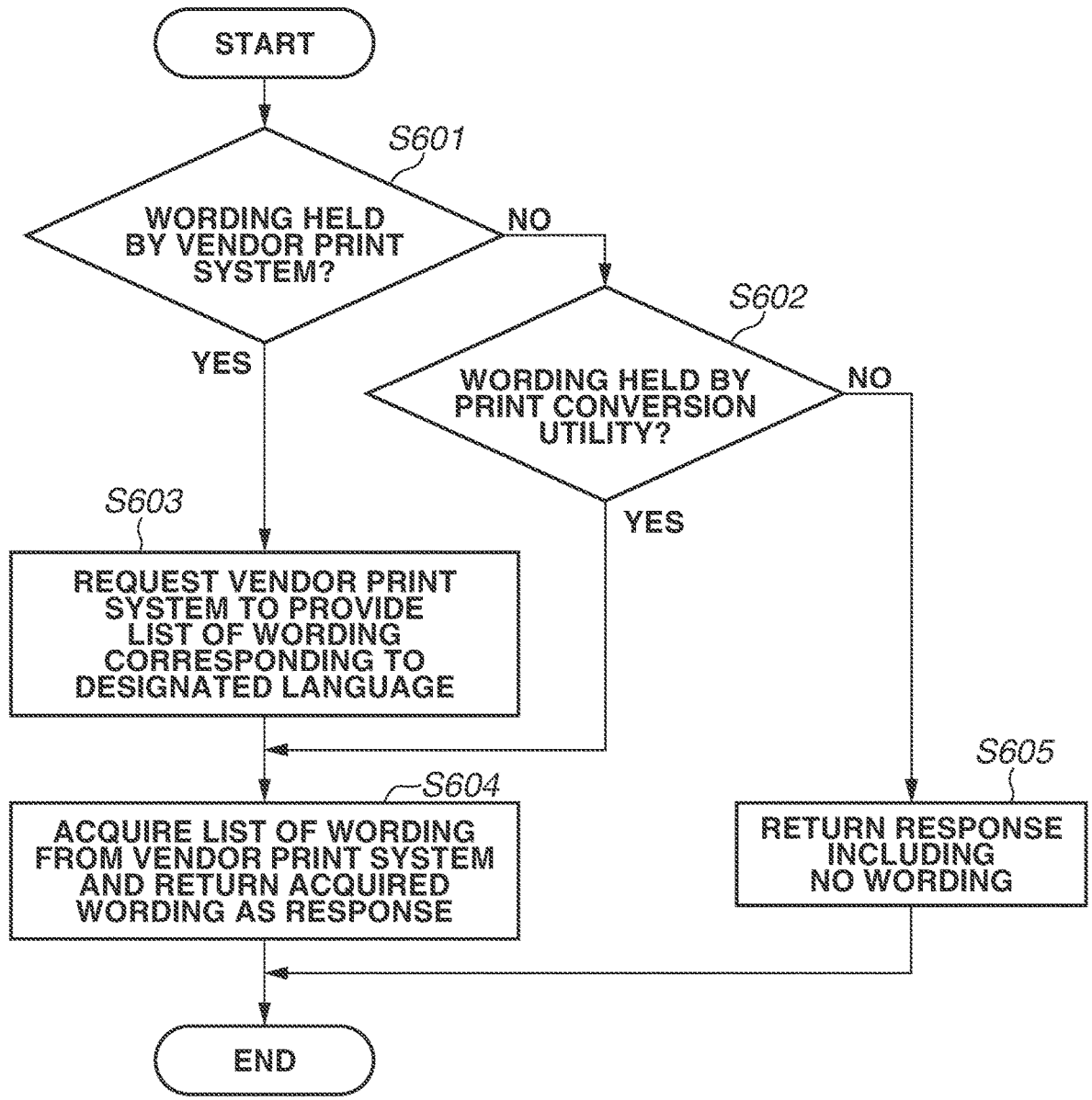
FIG. 6 is a diagram illustrating a flow of processing by the print conversion utility.

FIG. 6 illustrates a flow of processing to be executed by the print conversion utility 07. The processing in FIG. 6 begins in a case where the print conversion utility 07 receives the request for the list of wording issued in step S904 by the OS print system 03.

In step S601, in response to the request from the OS print system 03, the print conversion utility 07 determines whether the wording in the designated language is held by the vendor print system 08. The print conversion utility 07 has acquired the language list from the vendor print system 08 in step S502 described above. Therefore, step S601 is implemented by determining whether the language designated in the request issued in step S904 is included in the language list acquired in step S502.

If the print conversion utility 07 determines that the wording in the designated language is held by the vendor print system 08 (YES in step S601), the operation proceeds to step S603. In step S603, the print conversion utility 07 issues a request for the list of wording corresponding to the language designated in step S904, to the vendor print system 08. Based on the request issued in step S603, the vendor print system 08 acquires the list of wording corresponding to the designated language from the wording storage unit 14. For example, if the designated language is English, "Plain Paper", "Photo Paper", and "Matte Paper" are acquired as the wording for the paper type. If the designated language is German, "Normalpapier", "Fotopapier", and "Mattepapier" are acquired as the wording for the paper type. The vendor print system 08 transmits the acquired list of wording to the print conversion utility 07.

Subsequently, in step S604, upon acquiring the list of wording from the vendor print system 08, the print conversion utility 07 converts the acquired list of wording into a command that can be interpreted by the OS print system 03, and returns the command as a response to the request from the OS print system 03. If the print conversion utility 07 determines that the vendor print system 08 does not hold the wording in the designated language (NO in step S601), the processing proceeds to step S602. In step S602, the print conversion utility 07 determines whether the wording in the designated language is heled in the wording storage unit 13. If the print conversion utility 07 determines that the wording in the designated language is held in the wording storage unit 13 (YES in step S602), the processing proceeds to step S604. In step S604, the print conversion utility 07 reads out the wording in the designated language from the wording storage unit 13, converts the read-out wording in the designated language into a command that can be interpreted by the OS print system 03, and returns the command as a response to the request from the OS print system 03. If the print conversion utility 07 determines that the wording in the designated language is not held in the wording storage unit 13 (NO in step S602), the processing proceeds to step S605. In step S605, the print conversion utility 07 converts a response including no wording into a command that can be interpreted by the OS print system 03 and returns the command. In the present exemplary embodiment, the wording is acquired from the vendor print system 08 in step S604. However, the print conversion utility 07 can acquire the wording from the vendor print system 08 beforehand and hold the acquired wording in the wording storage unit 13. Holding the wording in the wording storage unit 13 by the print conversion utility 07 increases the speed of responding to the OS print system 03, so that the effect of improving the convenience of the user is obtained. As to the return method in step S604, the print conversion utility 07 may return the wording in the designated language as it is, or a different return method may be used. In a case where the wording in the designated language is returned as it is, for example, the print conversion utility 07 returns a character string of "Normalpapier", "Fotopapier", and "Mattepapier" to the OS print system 03.

Next, another return method will be described with reference to FIG. 12. FIG. 12 illustrates the contents of a command for wording acquisition included in the request command for printer capability information issued by the OS print system 03 to the print conversion utility 07, and a response command issued in response to the request command.

In FIG. 12, 'ja' of a command 1201 represents a designated language, and 'printer-strings-uri' represents a wording acquisition request. More specifically, Japanese is selected by the processing in step S903, and therefore, the OS print system 03 designates Japanese and requests the wording acquisition thereof in step S904.

A command 1202 is an address indicating a place where the wording is stored, and the wording is stored in a file saved in the indicated place. More specifically, the print conversion utility 07 acquires the character strings of "Normalpapier", "Fotopapier", and "Mattepapier" from the vendor print system 08 in step S604, and stores the acquired character strings in the wording storage unit 13. Subsequently, the print conversion utility 07 returns a response command including the address indicating the place where the character strings are stored to the OS print system 03. As a result, the OS print system 03 can access the storage place designated by the command 1202 and acquire the character strings of "Normalpapier", "Fotopapier", and "Mattepapier".

Figure 11:
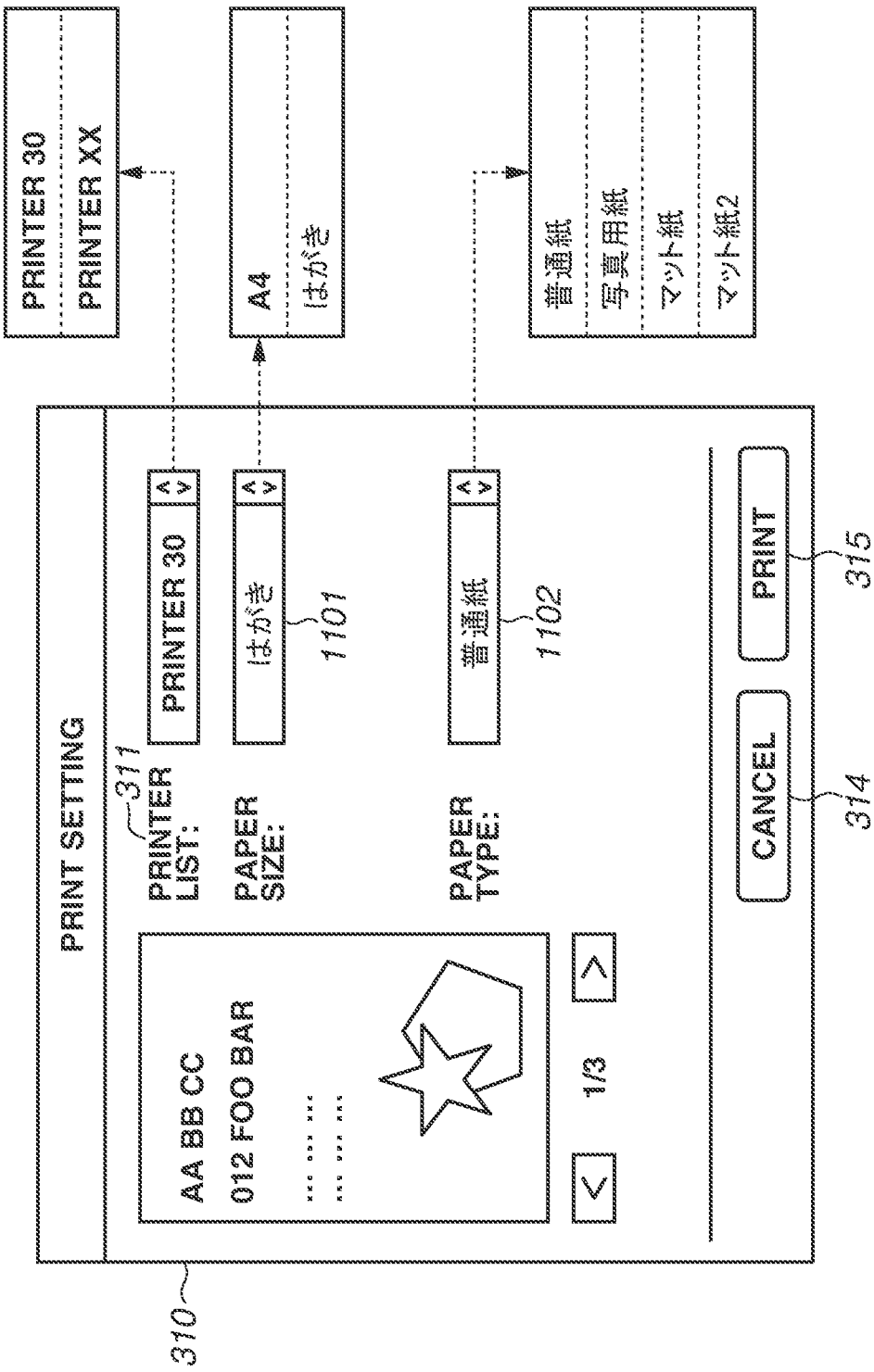
FIG. 11 is a diagram illustrating a print setting screen of the OS print system.

FIG. 11 illustrates the OS normal UI 310 in which the language expressing the options for the paper type is changed by the processing of the present exemplary embodiment. As described with reference to FIG. 2, the language held by the print conversion utility 07 is only English, but the languages held by the vendor print system 08 can include Japanese. Further, the user can set a priority higher than a priority given to English among the languages supported by the OS on Japanese, using the function of the OS. In such a case, an option 1101 for the paper type is displayed using the wording in Japanese, based on the processing of the present exemplary embodiment. Further, because the printer capability information about printers in the printer list 311 is reflected, all the types of sheet that can be used on a printer selected from the printer list 311 are displayed as options. This enables the OS normal UI 310 to display the wording in a language desired by the user, so that the convenience improves. The description with reference to FIG. 11 is provided mainly focusing on the paper type, but options are similarly displayed for other setting items (e.g., the paper size).

As described above, in the present exemplary embodiment, the types of language into which the language that can be displayed by the print conversion utility 07 and the language that can be displayed by the vendor print system 08 are integrated are returned to the OS print system 03. This increases the possibility that the wording in a language desired by the user is displayed on the OS normal UI 310, so that the convenience of the user improves. The processing of the present exemplary embodiment can be applied in a different mode as long as the processing is applied at the timing when the printer capability information is acquired from the print conversion utility 07. For example, the processing of the present exemplary embodiment can be applied in another mode such as in a case where the user registers the printer 30 in the OS print system 03 as a printer that can be used via the print conversion utility 07.

In the first exemplary embodiment, the OS print system 03 displays the wording acquired from the print conversion utility 07 on the OS normal UI 310. However, there is a case where both the vendor print system 08 and the OS print system 03 hold the wording in a designated language. In such a case, using newer wording can improve the convenience of the user. Thus, in a second exemplary embodiment, in a case where both the OS print system 03 and the vendor print system 08 hold the wording in the same language, more appropriate wording is displayed for the user.

In the present exemplary embodiment, similar to the first exemplary embodiment, the OS print system 03 requests the print conversion utility 07 to provide a language list, and processing therefor in the present exemplary embodiment is common to the processing in FIG. 9 and thus will not be described in detail. For other points as well, if processing therefor is similar to that in the first exemplary embodiment, the processing will not be described in detail.

When the OS print system 03 issues a request for acquiring a list of wording for the paper type to the print conversion utility 07 in step S904, the OS print system 03 issues a request for printer capability information to the print conversion utility 07 using the OS normal protocol. FIG. 10 illustrates an example of a request command requesting printer capability information issued from the OS print system 03 to the print conversion utility 07. In FIG. 10, the command is described based on the IPP. In a case where the OS print system 03 requests the print conversion utility 07 to provide the printer capability information, the request command includes version information about the OS print system 03. A command 1001 in FIG. 10 is an attribute that holds the version information about the OS print system 03, and version information 1002 is described in the command (attribute) 1001. A command 1003 describes the content of the request.

In the present exemplary embodiment, the print conversion utility 07 has a table that holds an update date and time corresponding to the version of the OS print system 03 as a time stamp. The print conversion utility 07 also has a table that holds an update date and time corresponding to the version of the vendor print system 08 as a time stamp. FIG. 8 illustrates tables 810 and 811 as examples of the two tables. As illustrated in FIG. 8, version information 801 of the vendor print system 08 is managed in association with time stamp information 802. Version information 803 of the OS print system 03 is managed in association with time stamp information 804. The print conversion utility 07 can determine which one of the version information 803 of the OS print system 03 and the version information 801 of the vendor print system 08 is newer using the tables 810 and 811 in FIG. 8.

Figure 7:
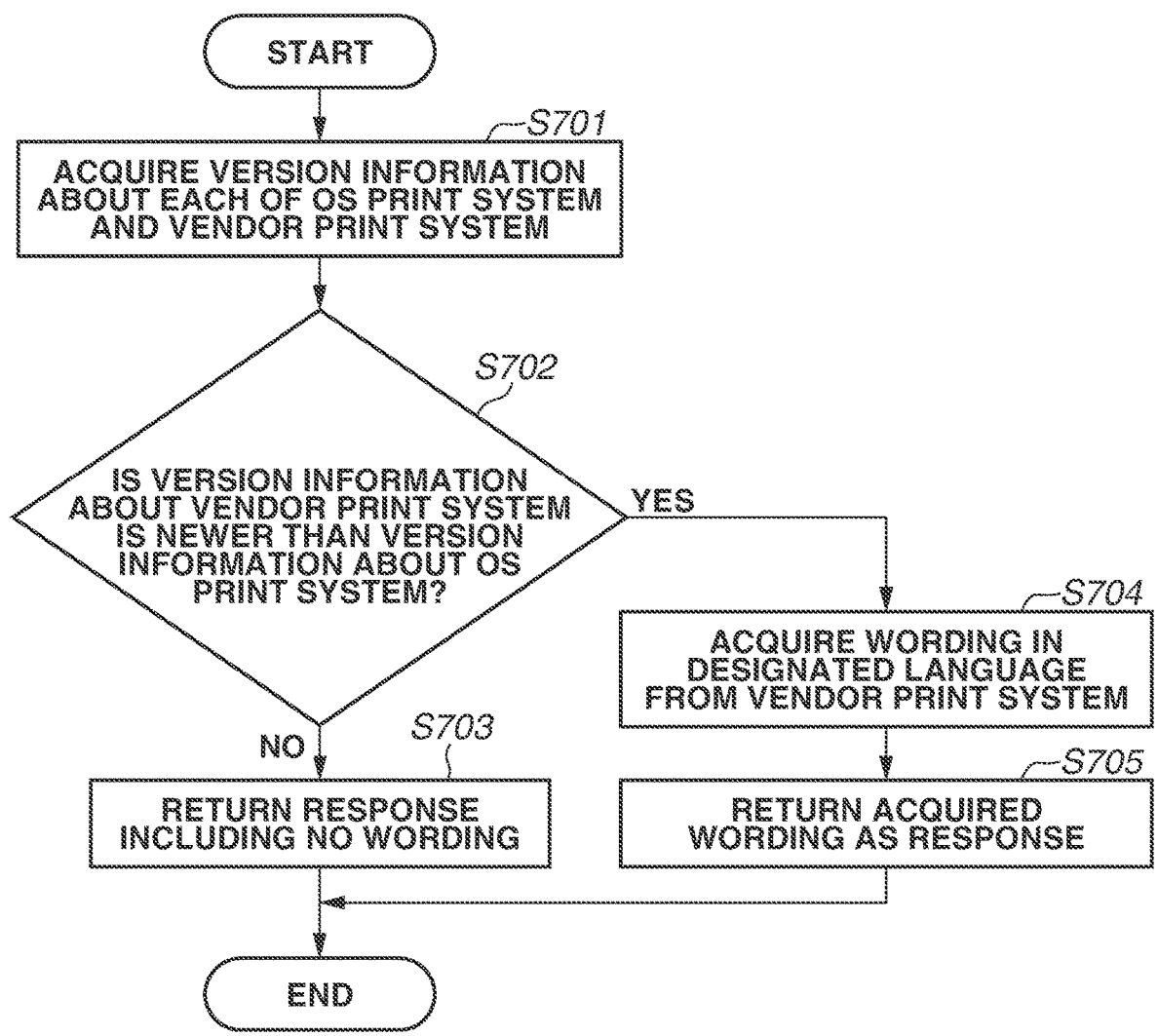
FIG. 7 is a diagram illustrating a flow of processing by the print conversion utility.

FIG. 7 is a diagram illustrating a flow of processing to be executed by the print conversion utility 07. In a case where the print conversion utility 07 receives the request for acquiring the list of wording from the OS print system 03 in step S904, the processing in FIG. 7 starts. In step S701, the print conversion utility 07 acquires the version information about the OS print system 03 included in the request command as information for determining whether the wording is old or new. Further, the print conversion utility 07 acquires the version information about the vendor print system 08 from the vendor print system 08. In step S702, the print conversion utility 07 determines whether the version information about the vendor print system 08 is newer than the version information about the OS print system 03 (i.e., performs version determination) using the version information about the vendor print system 08, the version information about the OS print system 03, and the above-described tables 810 and 811 in FIG. 8. If the print conversion utility 07 determines that the version information about the vendor print system 08 is newer than the version information about the OS print system 03 (YES in step S702), the processing proceeds to step S704. In step S704, the print conversion utility 07 acquires the wording in the designated language from the vendor print system 08. In step S705, the print conversion utility 07 returns information corresponding to the wording acquired in step S704 to the OS print system 03 as a response to the wording acquisition request from the OS print system 03. If the print conversion utility 07 determines that the version information about the vendor print system 08 is not newer than the version information about the OS print system 03 (NO in step S702), the processing proceeds to step S703. In step S703, the print conversion utility 07 returns a response including no wording to the OS print system 03.

In the present exemplary embodiment, the version information about the vendor print system 08 is used as the information for determining the update date and time of the wording, but the information for determining the update date and time of the wording is not limited thereto. For example, other kinds of information held by the vendor print system 08, such as an update date and time of wording, time stamp information within a file, and an update date and time of module may be used.

Figure 13:
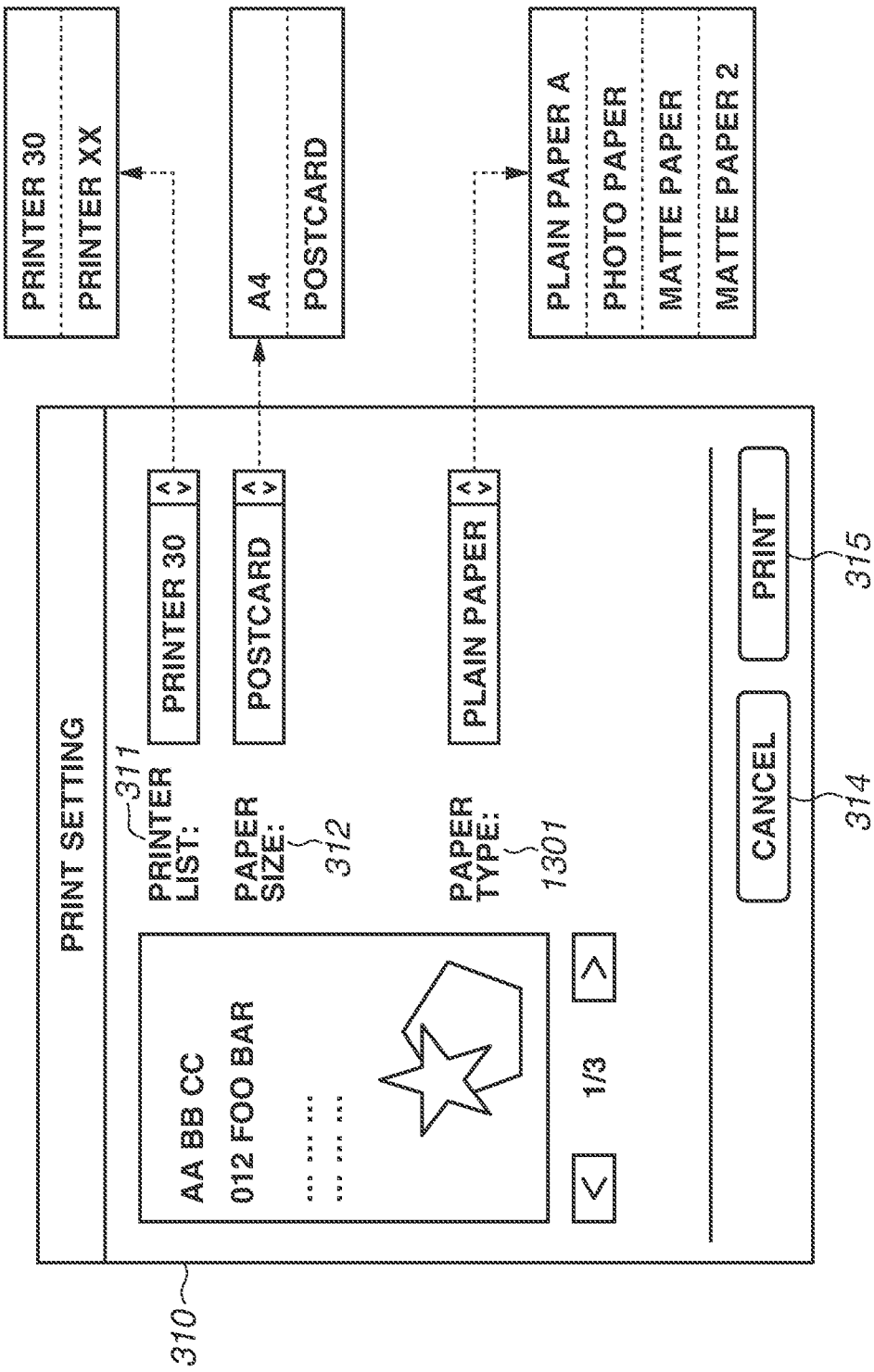
FIG. 13 is a diagram illustrating a print setting screen of the OS print system.

After acquiring the list of wording in the designated language from the print conversion utility 07, the OS print system 03 reflects the wording for the paper type 313 on the OS normal UI 310. FIG. 13 illustrates an example of the OS normal UI 310 reflecting the wording. In a case where the version information about the OS print system 03 is newer than the version information about the vendor print system 08, the wording of the OS print system 03 is reflected on the OS normal UI 310. Thus, the wording held by the OS print system 03 is displayed in paper type 1301 so that "Plain PaperA" appears in place of "Plain Paper" in comparison with the paper type 313.

As described above, in the present exemplary embodiment, the print conversion utility 07 compares the version information about the vendor print system 08 and the version information about the OS print system 03 when acquiring the list of wording, and determines whether to transmit the wording information in the vendor print system 08 based on the result of the comparison. As a result, the newer wording can be displayed for the user when the OS normal printing function is used, so that the convenience of the user improves.

Next, a third exemplary embodiment of the present disclosure will be described. The present exemplary embodiment has many points in common with the first exemplary embodiment. Thus, a point different from the first exemplary embodiment will be described in detail, and a similar point will not be described in detail.

Figure 14:
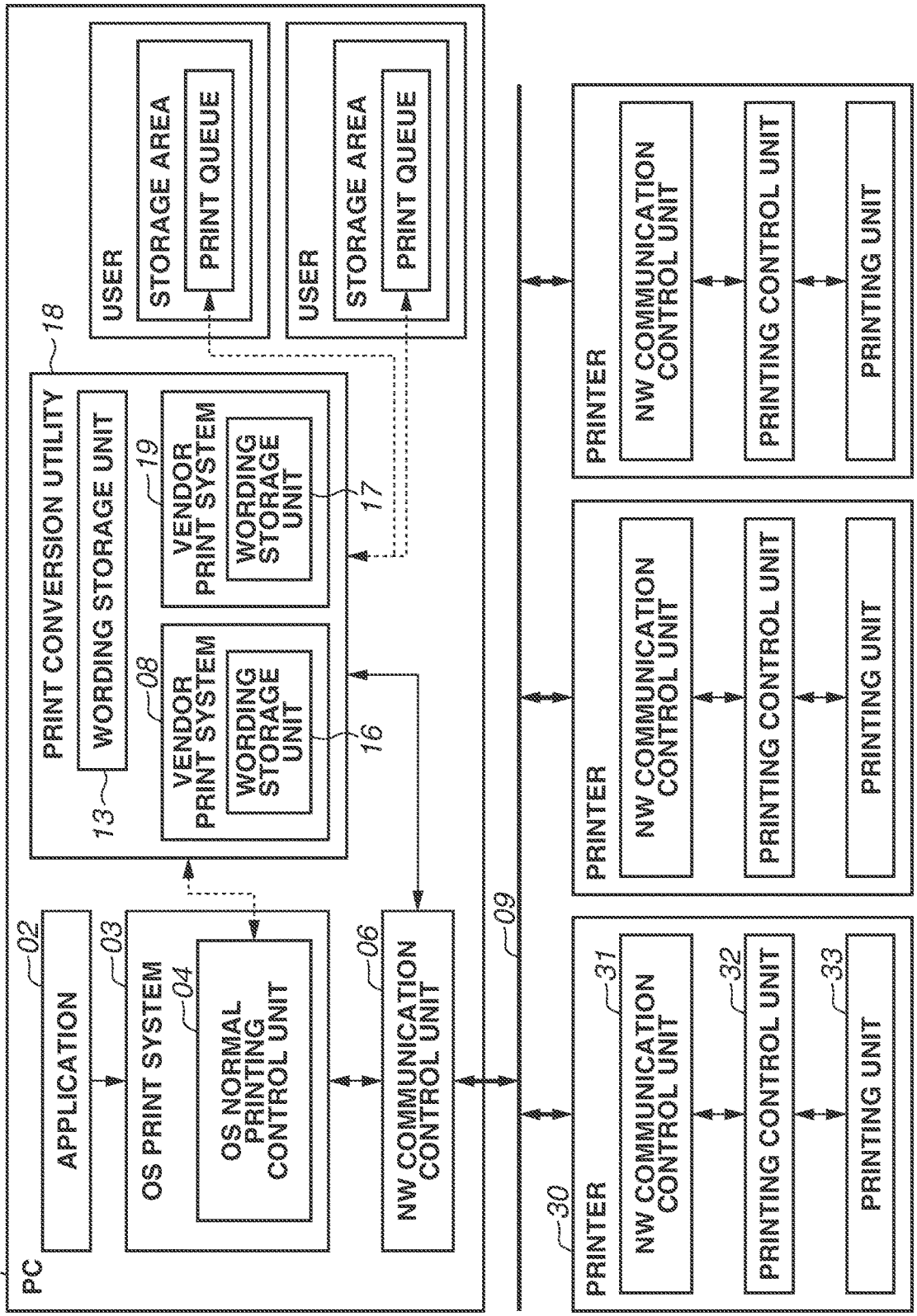
FIG. 14 is a diagram illustrating an overall configuration of a print system.

FIG. 14 is a diagram illustrating an overall configuration of a print system according to the present exemplary embodiment. The point different from the first exemplary embodiment is that a print conversion utility 18 includes a vendor print system 19, in addition to the vendor print system 08, in a PC 15. Other points of the configuration are similar to those in FIG. 1 of the first exemplary embodiment.

The present exemplary embodiment will be described using an example in which a user selects the printer 30 from the printer list 311 on the OS normal UI 310 as a printer to be used.

To enable print setting for the printer 30, the OS print system 03 issues a request for printer capability information to the print conversion utility 07, and reflects the printer capability information in the paper size 312 and the paper type 313 on the OS normal UI 310. Similar to the first exemplary embodiment, the OS print system 03 executes the processing in FIG. 9.

Figure 15:
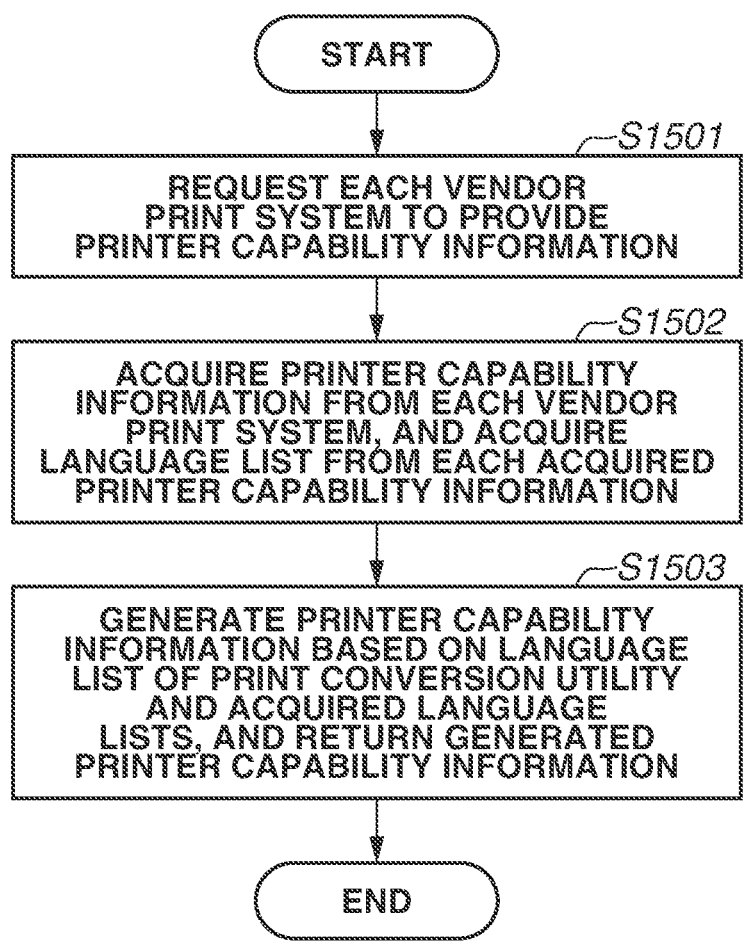
FIG. 15 is a diagram illustrating a flow of processing by a print conversion utility.

FIG. 15 illustrates a flow of processing to be executed when the print conversion utility 18 responds to the request for printer capability information (issued in step S901) received from the OS print system 03. In step S1501, upon receiving the request for printer capability information from the OS print system 03, the print conversion utility 18 converts the request into a command that can be interpreted by the vendor print system 08 and a command that can be interpreted by the vendor print system 19. Subsequently, the print conversion utility 18 issues a request for printer capability information to each of the vendor print systems 08 and 19. In step S1502, the print conversion utility 18 acquires a response to the request from each of the vendor print systems 08 and 19, and acquires information indicating a language list stored in each of wording storage units 16 and 17 of the respective vendor print systems 08 and 19, from the printer capability information. In step S1503, the print conversion utility 18 integrates the language list stored in the wording storage unit 13 and the language list acquired from each of the vendor print systems 08 and 19, and generates the printer capability information based on the integrated language lists. As for printer capability information other than the language, the printer capability information is generated using the information acquired from the vendor print system corresponding to the printer selected in the printer list 311. Subsequently, the print conversion utility 18 converts the printer capability information into a command that can be interpreted by the OS print system 03, and returns the command as a response, using the OS normal protocol.

Figure 16:
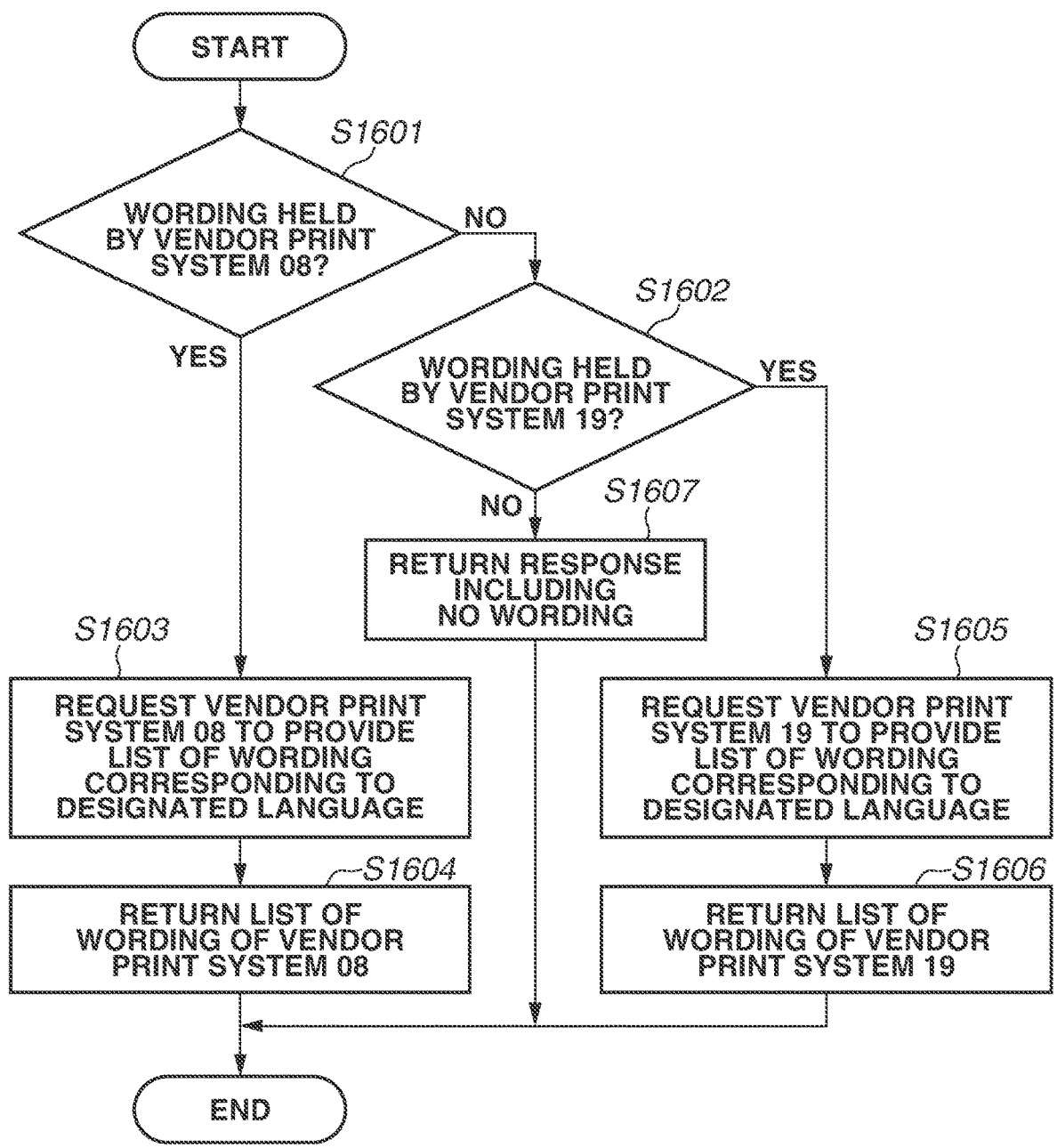
FIG. 16 is a diagram illustrating a flow of processing by the print conversion utility of FIG. 15.

The processing in FIG. 15 enables the OS print system 03 to execute step S904. As a result, the print conversion utility 18 receives the request issued by the OS print system 03 in step S904. In a case where the request is received, a flow of processing in FIG. 16 starts. The processing illustrated in FIG. 16 is to be executed by the print conversion utility 18.

In step S1601, upon receiving the request from the OS print system 03, the print conversion utility 18 converts the request into a command that can be interpreted by the vendor print system 08. Subsequently, the print conversion utility 18 issues a request for printer capability information to the vendor print system 08, acquires the printer capability information, and determines whether the wording in the designated language is held by the vendor print system 08 based on the acquired printer capability information.

The print conversion utility 18 has acquired the language list from the vendor print system 08 in step S1502 described above. Thus, step S1601 may be implemented by determining whether the language designated in the request issued in step S904 is included in the language list acquired in step S1502. If the print conversion utility 18 determines that the vendor print system 08 holds the designated language (YES in step S1601), the processing proceeds to step S1603. In step S1603, the print conversion utility 18 acquires the list of wording from the wording storage unit 16 of the vendor print system 08. Subsequently, in step S1604, the print conversion utility 18 converts the acquired list of wording into a command that can be interpreted by the OS print system 03, and returns the command as a response to the request from the OS print system 03.

If the print conversion utility 18 determines that the vendor print system 08 does not hold the designated language (NO in step S1601), the processing proceeds to step S1602. In step S1602, the print conversion utility 18 converts the received request into a command that can be interpreted by the vendor print system 19. Subsequently, the print conversion utility 18 issues a request for the printer capability information to the vendor print system 19, acquires the printer capability information, and determines whether the vendor print system 19 holds the wording in the designated language based on the acquired printer capability information. If the print conversion utility 18 determines that the vendor print system 19 holds the designated language (YES in step S1602), step S1605 and step S1606 are executed. Steps S1605 and S1606 are similar to steps S1603 and S1604, respectively, and thus will not be described in detail. Only a point different from steps S1603 and S1604 will be described. The print conversion utility 18 requests the wording corresponding to the printer capability information of the printer 30 designated in the printer list 311. For example, a case is cited where the printer 30 supporting the vendor print system 08 can execute printing using plain paper, photo paper, and matte paper. Meanwhile, the printer supporting the vendor print system 19 can execute printing using plain paper, photo paper, matte paper, and thick paper. In this case, the print conversion utility 18 requests the vendor print system 19 to provide the wording of plain paper, photo paper, and matte paper in step S1605.

If the print conversion utility 18 determines that the vendor print system 19 does not hold the designated language (NO in step S1602), i.e., both of the vendor print systems 08 and 19 do not hold the designated language, the processing proceeds to step S1607. In step S1607, the print conversion utility 18 converts a response including no wording into a command that can be interpreted by the OS print system 03, and returns the command.

In the present exemplary embodiment, when receiving the request for wording from the OS print system 03, the print conversion utility 18 including a plurality of vendor print systems returns the language supported by any one of the vendor print systems included in the print conversion utility 18 in response to the request from the OS print system 03, as the language list. This increases the possibility that the wording in a language desired by the user is displayed on the OS normal UI 310, so that the convenience of the user improves. The number of the vendor print systems included in the print conversion utility 18 may be three or more.

In the above-described exemplary embodiments, in a case where the non-support printer is designated, the print conversion utility 07 operates to generate the print data that can be interpreted by the non-support printer, and transmit the generated print data to the non-support printer, but the exemplary embodiments are not limited thereto. For example, the user can register a printer supporting the OS normal printing control unit 04 in the print conversion utility 07. In this case, the registered printer supporting the OS normal printing control unit 04 is handled as a non-support printer.

Each of the above-described exemplary embodiments can also be implemented by executing the following processing. Software (a program) that implements a function of each of the above-described exemplary embodiments is supplied to a system or an apparatus via a network or a storage medium. A computer (such as a CPU, a micro processing unit (MPU), or a processor) of the system or apparatus reads out the program to execute the processing. The program may be executed by one computer or may be executed by a plurality of computers operating together. Moreover, it is not necessary to implement all the above-described processing by software, and a part or all of the processing may be implemented by hardware such as an application-specific integrated circuit (ASIC).

The CPU is not limited to a single CPU that performs all the processing, and a plurality of CPUs may perform the processing in cooperation with each other as appropriate.

The convenience of the user can be improved.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-237552, filed Dec. 26, 2019, which is hereby incorporated by reference herein in its entirety.

What is claimed is:

1. An information processing apparatus that manages information about a printing apparatus incapable of interpreting print data in a predetermined format and that executes operating system (OS) normal printing software that generates print data in the predetermined format, the information processing apparatus comprising:
   one or more processors; and
   at least one memory storing executable instructions, which when executed by the one or more processors, cause the information processing apparatus to perform functions of:
      a control unit configured to receive first print data via the OS normal printing software in a case where the printing apparatus incapable of interpreting print data in the predetermined format is selected and an instruction for printing execution is issued;
      a generation unit configured to generate second print data interpretable by the printing apparatus incapable of interpreting print data in the predetermined format based on the first print data; and
      a transmission unit configured to transmit the second print data to the printing apparatus incapable of interpreting print data in the predetermined format,
      wherein, in a case where capability information about the printing apparatus incapable of interpreting print data in the predetermined format is requested from the OS normal printing software, the control unit generates the capability information based on language information held by the control unit and language information held by the generation unit, and transmits the generated capability information to the OS normal printing software, and
      wherein, in the case where the capability information about the printing apparatus incapable of interpreting print data in the predetermined format is requested from the OS normal printing software, the control unit acquires the language information held by the generation unit, and generates the capability information based on the language information held by the control unit and the language information acquired from the generation unit.

2. The information processing apparatus according to claim 1, wherein the executable instructions, when executed by the one or more processors, further cause the information processing apparatus to perform functions of:
   a determination unit configured to determine whether the generation unit includes an option corresponding to a language designated by the OS normal printing software based on the capability information,
   wherein, in a case where the determination unit determines that the generation unit includes the option corresponding to the designated language, the control unit issues a request for the option corresponding to the designated language to the generation unit.

3. The information processing apparatus according to claim 2, wherein the option corresponding to the designated language and acquired in response to the request is displayed by the OS normal printing software.

4. The information processing apparatus according to claim 1, wherein the executable instructions, when executed by the one or more processors, further cause the information processing apparatus to perform functions of:
   a version determination unit configured to determine whether version information about the generation unit is newer than version information about the OS normal printing software based on the version information about the OS normal printing software and the version information about the generation unit,
   wherein, in a case where the version determination unit determines that the version information about the generation unit is newer than the version information about the OS normal printing software, the control unit transmits information that corresponds to the option corresponding to the designated language and acquired from the generation unit to the OS normal printing software, and in a case where the version determination unit does not determine that the version information about the generation unit is newer than the version information about the OS normal printing software, the control unit does not transmit information that corresponds to the option corresponding to the designated language and acquired from the generation unit to the OS normal printing software.

5. The information processing apparatus according to claim 1, wherein, in a case where the capability information about the printing apparatus incapable of interpreting print data in the predetermined format is requested from the OS normal printing software, the control unit generates the capability information based on the language information held by the control unit, the language information held by the generation unit, and language information held by a generation unit of a printing apparatus different from the printing apparatus.

6. A control method for an information processing apparatus that manages information about a printing apparatus incapable of interpreting print data in a predetermined format and executes operating system (OS) normal printing software that generates print data in the predetermined format, control software that receives first print data via the OS normal printing software in a case where the printing apparatus incapable of interpreting print data in the predetermined format is selected and an instruction for printing execution is issued, and generation software that generates second print data interpretable by the printing apparatus incapable of interpreting print data in the predetermined format based on the first print data, the control method comprising:

transmitting the second print data to the printing apparatus incapable of interpreting print data in the predetermined format, wherein, in a case where capability information about the printing apparatus incapable of interpreting print data in the predetermined format is requested from the OS normal printing software, the capability information is generated based on language information held by the control software and language information held by the generation software, and wherein, in the case where the capability information about the printing apparatus incapable of interpreting print data in the predetermined format is requested from the OS normal printing software, the language information held by the generation software is acquired, and the capability information is generated based on the language information held by the control software and the language information acquired from the generation software.

7. The control method according to claim 6, further comprising determining whether the generation software includes an option corresponding to a language designated by the OS normal printing software based on the capability information, wherein, in a case where the generation software is determined as including the option corresponding to the designated language, a request for the option corresponding to the designated language is issued to the generation software.

8. The control method according to claim 7, wherein the option corresponding to the designated language and acquired in response to the request is displayed by the OS normal printing software.

9. The control method according to claim 6, further comprising determining whether version information about the generation software is newer than version information about the OS normal printing software based on the version information about the OS normal printing software and the version information about the generation software, wherein, in a case where the version information about the generation software is determined to be newer than the version information about the OS normal printing software, information that corresponds to the option corresponding to the designated language and acquired from the generation software is transmitted to the OS normal printing software, and in a case where the version information about the generation software is not determined to be newer than the version information about the OS normal printing software, the information that corresponds to the option corresponding to the designated language and acquired from the generation software is not transmitted to the OS normal printing software.

10. The control method according to claim 6, wherein, in a case where the capability information about the printing apparatus incapable of interpreting print data in the predetermined format is requested from the OS normal printing software, the capability information is generated based on the language information held by the control software, the language information held by the generation software, and language information held by generation software of a printing apparatus different from the printing apparatus.

11. A non-transitory computer-readable storage medium storing a program for causing a computer to execute a control method, the computer managing information about a printing apparatus incapable of interpreting print data in a predetermined format and executing operating system (OS) normal printing software that generates print data in the predetermined format, control software that receives first print data via the OS normal printing software in a case where the printing apparatus incapable of interpreting print data in the predetermined format is selected and an instruction for printing execution is issued, and generation software that generates second print data interpretable by the printing apparatus incapable of interpreting print data in the predetermined format based on the first print data, the control method comprising:

transmitting the second print data to the printing apparatus incapable of interpreting print data in the predetermined format, wherein, in a case where capability information about the printing apparatus incapable of interpreting print data in the predetermined format is requested from the OS normal printing software, the capability information is generated based on language information held by the control software and language information held by the generation software, and wherein, in the case where the capability information about the printing apparatus incapable of interpreting print data in the predetermined format is requested from the OS normal printing software, the language information held by the generation software is acquired, and the capability information is generated based on the language information held by the control software and the language information acquired from the generation software.

12. The non-transitory computer-readable storage medium according to claim 11, wherein the method further comprises determining whether the generation software includes an option corresponding to a language designated by the OS normal printing software based on the capability information, and wherein, in a case where the generation software is determined as including the option corresponding to the designated language, a request for the option corresponding to the designated language is issued to the generation software.

13. The non-transitory computer-readable storage medium according to claim 12, wherein the option corresponding to the designated language and acquired in response to the request is displayed by the OS normal printing software.

14. The non-transitory computer-readable storage medium according to claim 11, wherein the method further comprises determining whether version information about the generation software is newer than version information about the OS normal printing software based on the version information about the OS normal printing software and the version information about the generation software, and wherein, in a case where the version information about the generation software is determined to be newer than the version information about the OS normal printing software, information that corresponds to the option corresponding to the designated language and acquired from the generation software is transmitted to the OS normal printing software, and in a case where the version information about the generation software is not determined to be newer than the version information about the OS normal printing software, the information that corresponds to the option corresponding to the designated language and acquired from the generation software is not transmitted to the OS normal printing software.

15. The non-transitory computer-readable storage medium according to claim 11, wherein, in a case where the capability information about the printing apparatus incapable of interpreting print data in the predetermined format is requested from the OS normal printing software, the capability information is generated based on the language information held by the control software, the language information held by the generation software, and language information held by generation software of a printing apparatus different from the printing apparatus.

\* \* \* \* \*